United States Patent [19]

Salminen et al.

[11] Patent Number: 4,703,846
[45] Date of Patent: Nov. 3, 1987

[54] METHOD AND APPARATUS FOR ARRANGING FRAGMENTARY PARTICLES INTO A ROW CONSISTING OF INDIVIDUAL PARTICLES

[75] Inventors: Karl O. Salminen, Vanha-Ulvila; Heimo J. Heino, Pori; Pertti T. Lehtonen, Vanha-Ulvila; Seppo V. Koskinen, Pomarkku; Tuomo V. Kivistö, Outokumpu; Lasse J. Rinta-Keturi; Heikki J. Sipilä, both of Espoo, all of Finland

[73] Assignee: Outokumpu Oy, Outokumpu, Finland

[21] Appl. No.: 557

[22] Filed: Jan. 5, 1987

Related U.S. Application Data

[63] Continuation of Ser. No. 731,536, May 7, 1985, abandoned, which is a continuation of Ser. No. 420,812, Sep. 21, 1982, abandoned.

[30] Foreign Application Priority Data

Sep. 24, 1981 [FI] Finland ............... 812974

[51] Int. Cl.$^4$ ................................. B65G 15/08
[52] U.S. Cl. ...................... 198/631; 198/825; 198/846; 209/681
[58] Field of Search ............... 198/819–821, 198/823, 825, 631, 818, 824, 826, 846; 209/923, 681

[56] References Cited

U.S. PATENT DOCUMENTS

| 700,308 | 5/1902 | Dodge | 198/818 X |
| 2,743,004 | 4/1956 | Wright | 198/631 |
| 2,904,175 | 9/1959 | Fitzgerald | 209/681 |
| 4,241,826 | 12/1980 | Billington | 198/825 |

FOREIGN PATENT DOCUMENTS

| 0532636 | 11/1954 | Belgium | 198/821 |
| 1079544 | 4/1960 | Fed. Rep. of Germany | 198/818 |
| 0591917 | 7/1925 | France | 198/825 |
| 0106319 | 1/1943 | Sweden | 198/823 |

Primary Examiner—Robert J. Spar
Assistant Examiner—D. Glenn Dayoan
Attorney, Agent, or Firm—Abelman Frayne Rezac & Schwab

[57] ABSTRACT

The invention relates to a method for arranging conveyor-transported fragmentary particles into one row or several adjacent rows of individual particles before their removal from the conveyor. According to the invention, the conveying base is divided into two subsequent sections, namely, a vibrating section and a subsequent stabilizing section. In the vibrating section the conveying base and the particles on top of it are brought into a relative motion while the particles are subjected to transversal counter-forces in order to concentrate the particles along a straight line in the longitudinal direction of the conveying base. In the stabilizing section the relative motion of the conveying base and the particles on top of it is stopped in good time before the removal of the particles from the conveyor, so that the particles no longer move in relation to each other when they are being removed from the conveyor. This substantially facilitates the analysis of the particles and their separation from each other.

3 Claims, 4 Drawing Figures

METHOD AND APPARATUS FOR ARRANGING FRAGMENTARY PARTICLES INTO A ROW CONSISTING OF INDIVIDUAL PARTICLES

This is a continuation of application Ser. No. 731,536 filed on May 7, 1985, now abandoned, which in turn is a continuation of application Ser. No. 420,812 filed Sept. 21, 1982, now abandoned.

BACKGROUND OF THE INVENTION

The present invention relates to a method for arranging conveyor-transported fragmentary particles of variegated shape into one or several adjacent rows of individual particles at as even intervals as possible for the purpose of, for example analysis and separation in which the fragments are analysed with regard to some property and separated into two or several products in accordance with predetermined separation criteria.

The invention also relates to an apparatus for carrying out the method according to the invention.

The analysis and separation of fragmentary particles, mentioned as one object of application of the invention, sets several requirements on the feeding of the particles. The analysis is performed either in air during the falling of the particle, or on the feeding device. In principle, only one fragment at a time may be, for the purpose of this operation, at the analysis and separation points which are of limited size. The analysis and separation times are in the order of 1-100 milliseconds, typically 5-30 ms, and the particles must be conveyed to the separation point in the same order as they arrived at the analysis point. The travel path and speed of the particle row must be as steady as possible. The particles must reach the analysis point and the separation point at as even intervals as possible, and these intervals should be as small as possible in order to achieve maximum capacity. Also, the apparatus must not break up the particles being handled, it must be reliable in operation in the surroundings in which it has been installed, and its price and operating costs must be as economical as possible.

Fragmentary particles have previously been arranged into a row of individual particles by means of, for example, vibrating feeders, which, however, have a disadvantage in a material travel speed which is too slow within the fragment-size range involved, the travel speed in the vibrating feeders used being in the reference experiments at maximum 0.2 m/s, although this speed can in certain cases be increased to above 0.5 m/s, e.g. to 0.8-2 m/s. However, it has been found that the speed optimal in terms of capacity in the case of the fragment-size ranges now in question is 0.8-1 m/s. Also, the deviation from the path by a fragment falling from a vibrating feeder is too great, partly owing to the vibratory motion continuing all the way to the end of the feeder, in which case the fragment at the point of falling from the end of the feeder may receive impulses having effect in different directions.

Profiled belts have also been used as devices forming a row of fragmentary particles, but they have a disadvantage in their limited capability to form a row. The flow of fragments from a preceding apparatus unit, such as a vibrating feeder, varies momentarily, and therefore the feeder may feed several fragments simultaneously, in which case, for example, angular rocks may remain one on top of the other or side by side on the profiled belt conveyor. Also, momentarily there may be no particles arriving from the conveyor, in which case a gap is formed in the row and full capacity is not achieved.

Also known is a grooved belt conveyor which "can be vibrated" by using an eccentric drive drum. In this case, however, in order to stabilize the paths of the particles, separate stabilizing devices are necessary onto which a fragment is dropped from the drive drum of the belt. Such a device is complicated and expensive, and in addition, the vibration remains weak owing to the dimensions of the drive drum. Also, the vibration is not focused specifically at the particle flow arriving on the belt, where it should be most effective.

The object of the present invention is therefore to provide a method and apparatus for arranging fragmentary particles into a row or adjacent rows of individual particles without the disadvantages present in the above-mentioned devices and methods.

SUMMARY OF THE INVENTION

In accordance with the present invention the above objectives are achieved by stopping the relative motion between the conveying base and the particles on top of it before the removal of the particles from the conveyor as a row or rows of individual particles. The stopping is not effected before the particles have had time to settle substantially successively and close to each other but, however, so early that the particles will have time to settle into a row of individual particles without moving in relation to each other or the conveying base when the particles are removed from the conveyor.

The relative motion of the conveying base and the particles on top of it can be produced by vibrating the first section of the conveying base, and advantageously at a point somewhat before the point where the particles arrive on the conveyor belt. The vibration of the conveying base is, however, stopped preferably when at maximum one-half and at minimum one-fourth of the conveyor length remains, in order to achieve a sufficiently long stabilization zone for the particles before they are removed from the conveyor belt. The lengths of the vibration zone and the stabilization zone can, of course, be increased, if other reasons so require, without the operating principle changing.

By bringing the conveying base and the particles on top of it into a relative motion, the static friction otherwise affecting the particles can be entirely eliminated, and consequently, the particles can be transferred, by means of very small transversal counter-forces, into a longitudinal straight line on the conveying base to form a row of individual particles. The said transversal counter-forces can be created by raising the side edges of the flexible belt serving as the conveying base in such a way that the belt forms a trough, and the particles tend to roll under the influence of gravity to its bottom. In this case at least the vibrated section of the conveyor belt is bent into a trough, but advantageously the trough-like section continues all the way to the point at which the particles are removed, in order to ensure that the particles can no longer move in the lateral direction away from the row formation.

The vibrator members used may be eccentric rollers supporting the first section of the conveying base, the rollers being advantageously fitted in pairs into a V-shape, and in the longitudinal direction of the conveyor they are dislocated in relation to each other or opposite each other.

The vibration can also be produced by vibrating by separate mechanisms, by transmission through their supporting structures, the smooth belt-supporting rollers or by vibrator mechanisms directly affecting the belt or, when belt materials having magnetic properties are used, by means of a varying magnetic field.

Slits or holes may be made in the belt, or the belt may be lighter in the middle, so as to obtain the desired trough shape.

In order to form several adjacent rows of particles it is possibel to use a profiled belt having several longitudinal grooves or ribs on its upper surface, and either to produce the vibration from below the belt or to focus the vibration at the ribs.

DESCRIPTION OF THE PREFERRED EMBODIMENT

Figure 1:
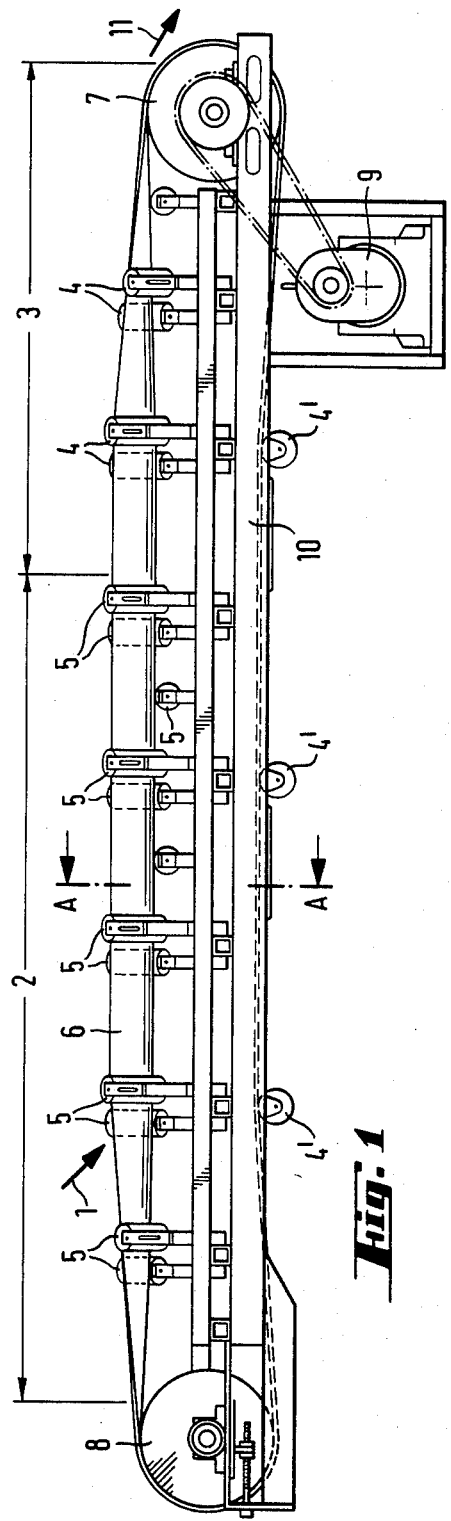
FIG. 1 illustrates a side view of a preferred embodiment of the invention.
Figure 2:
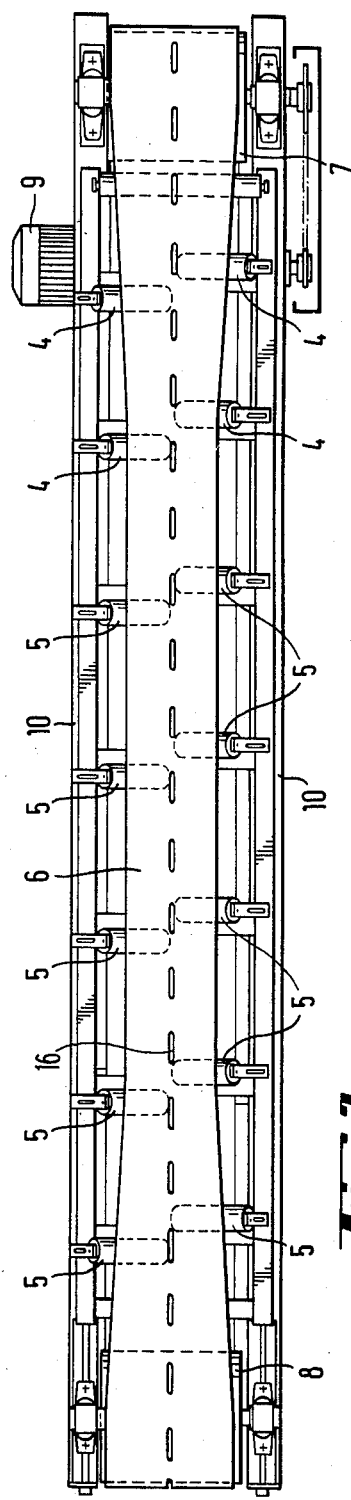
FIG. 2 illustrates a top view of the same embodiment.
Figure 3:
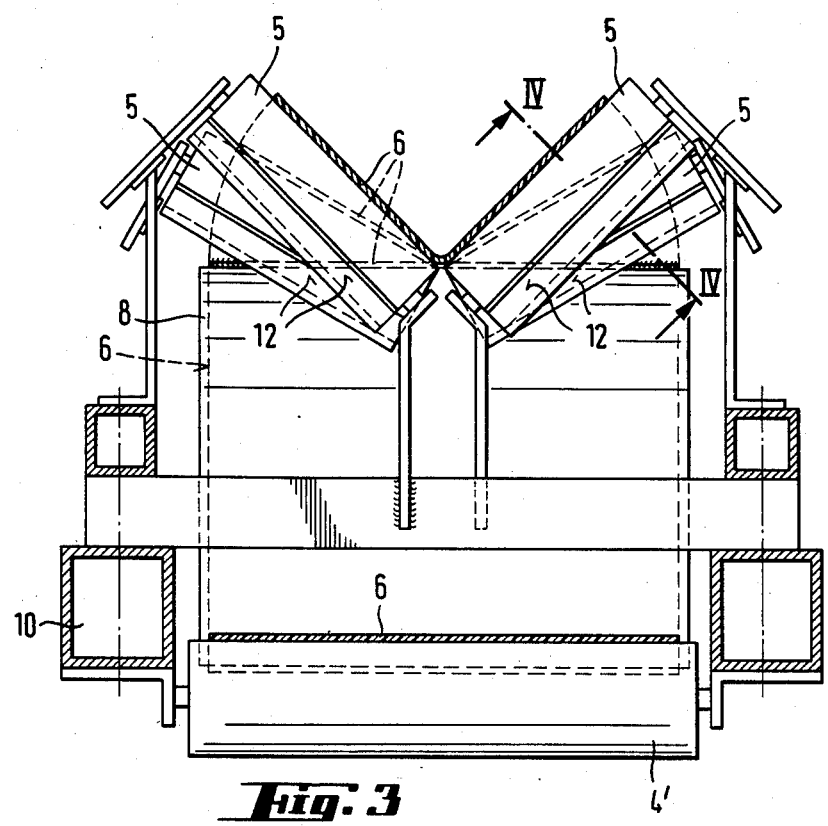
FIG. 3 is a section along line A—A in FIG. 1.

As seen in greater detail in FIGS. 1 and 2, the apparatus according to the invention consists of a conveyor having an oblong, rigid frame structure 10 which has at both ends a bending drum 7 and 8, one of the drums 7 being operationally connected to a motor 9 attached to the frame structure 10, the drum 7 serving as the drive drum. Over the drums 7 and 8 there is fitted an endless flexible belt 6 having its upper and lower sections supported by supporting rollers 4, 4' and 5. The rollers 4' supporting the lower section are attached by means of bearings to the lower section of the frame structure 10 so as to be supported by transversal horizontal shafts. The rollers 4 and 5 supporting the upper section, on the other hand, have been fitted in pairs into a V-shape in such a way that they are dislocated in relation to each other in the travel direction, and so that the flexible belt 6, supported by the rollers 4 and 5, forms a longitudinal trough. The belt 6 is provided with a continuous series of elongate slits 16 extending through the belt and axially thereof.

The feeding point for fragmentary particles onto the belt 6 is indicated by reference numeral 1 and the removal point by numeral 11. Numeral 2 indicates that part of the upper section of the conveyor 6 which is subjected to vibration in order to create a relative motion between the particles fed onto it and the conveying base, and numeral 3 indicates that part of the latter section of the upper section of the belt 6 which is not subjected to vibration, in order that the flow of fragments brought into a row of individual particles in the vibrated zone 2 stabilize so that the particles no longer move in relation to each other and in relation to the conveying base before they leave the conveyor at the point 11.

Figure 4:
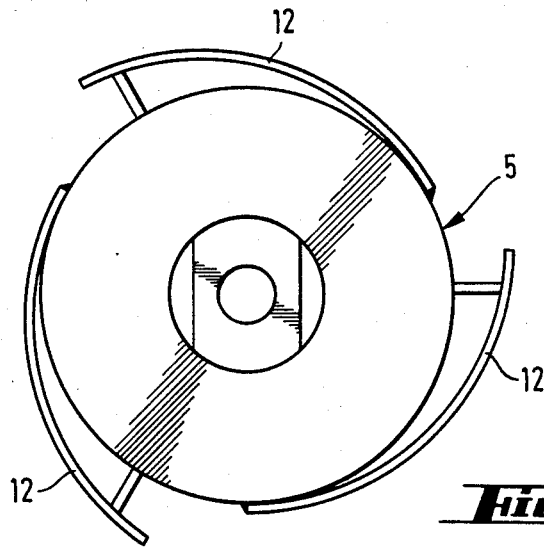
FIG. 4 illustrates an end view of the vibration roller used as the vibrator member in an apparatus according to the invention.

The vibration effect in the zone 2 is created by means of eccentric rollers 5, one of which is shown in greater detail in FIG. 4. As seen in FIG. 4, eccentric surfaces 12 are fitted at regular intervals from each other on the circumference of the roller 5, and these surfaces 12 intermittently raise the belt and then again let it drop. The eccentric surfaces may, if so desired, also be at irregular intervals and have cross sections of different shapes in order to obtain an optimal vibration effect on the particles being fed.

The present invention is thus based on the idea that by dividing the conveyor into two subsequent zones 2 and 3, the first one being a vibration zone 2 and the second one a stabilization zone 3, the particles can be effectively arranged into a row of individual particles and thereafter stabilized in such a way that the particles no longer move in relation to each other or the conveying base before the removal point 11.

It is evident that it is possible to form simultaneously several adjacent rows by using a grooved belt or a belt having several parallel adjacent furrows or ribs.

The analysis and separation take place either on a row in a free falling motion beyond the point 11, at which time the intervals between the rocks increase sufficiently, or on a concentrated row in the stabilization zone 3, or by analysing in the stabilization zone 3 and by separating thereafter the particles from a freely falling row beyond the point 11. By changing the speed of the vibrating and stabilizing belt conveyor it is possible to affect the interval distribution of the particles, in which case it is possible to find an optimum speed at which, with constant capacity, the minimum is reached in the proportion of intervals shorter than a certain free interval between the particles.

EXAMPLE

During the developing of the apparatus, the intervals between the fragments (interval distributions) were measured by means of a special apparatus, the development work aiming at obtaining an apparatus which feeds at maximally even intervals and produces a sufficient interval between the fragments. The path scatterings were determined by photographing by means of an extra rapid camera the paths from the front and the side. After small-scale experiments had been carried out, the trial apparatuses were on a scale 1:1.

The advantageousness of the vibrating-stabilizing belt conveyor in the formation of a row of fragments is illustrated by the following typical result of a comparison experiment:

| Row-forming apparatus | Interval distribution % under 20 ms | Feed, particles/s |
|---|---|---|
| Vibrating-stabilizing belt conveyor | 4.3 | 11.4 |
| Corresponding trough belt feeder (no vibration) | 13.4 | 11.0 |

The measurements were performed at a point where the speed of the row in a free falling motion was 4 m/s, the rock fraction (crushed dolomite) 25–50 mm, the speed of the belt in each case 0.91 m/s.

What is claimed is:

1. A method of arranging a random collocation of discrete particles into a single line of individual particles arranged in serial sequential orientation, comprising:
    driving a continuous flexible conveyor belt having a substantially horizontal upper run at a determined linear velocity;
    said conveyor belt being comprised of dual belt portions, and an interconnection between said belt portions at adjacent longitudinal edges thereof, said interconnection being comprised of residual portions interconnecting said respective belt portions and which lie intermediate elongate slits extending through said belt and arranged longitudinally thereof;

flexing said belt portions throughout substantially the entire said upper run of said conveyor belt into downwardly convergent substantially planar sides of a sharp-angled V-shaped trough by flexing said belt portions about said interconnection;

vibrating said V-shaped formation of belt portions throughout an extent of said upper run commencing at an entrance end of said conveyor belt and terminating spaced from an exit end thereof; and permitting a continuous stream of said random collocation of discrete particles to fall onto said V-shaped trough at a location adjacent said entrance end of said conveyor;

whereby said vibrating belt portions act to maintain all particles other than single particles at rest in the inverted apex of said trough in continued animation pending location of said particles serially and sequentially in the inverted apex of said horizontally travelling trough.

2. A conveyor for use in arranging a random collocation of discrete particles into a single line of individual particles arranged in serial sequential orientation, comprising:

a continuous belt of resiliently flexible material providing dual belt portions extending longitudinally of said conveyor with edges thereof mutually parallel to and adjacent each other; and an interconnection between adjacent parallel edges of said respective belt portions of greater flexibility than the flexibility of said belt portions per se, and means for forming and supporting said belt into a sharp angled V-shaped trough at said interconnection said interconnection being provided by residual portions of said belt interconnecting said belt portions, and which have been provided by forming elongate slits through said belt and extending longitudinally thereof at axially spaced positions.

3. Apparatus for use in arranging a random collocation of discrete particles into a single line of individual particles arranged in serial sequential orientation comprising:

a continuous flexible conveyor belt having a substantially horizontal upper run;

means driving said conveyor belt at a substantially constant determined linear velocity;

said conveyor belt being comprised of dual belt portions interconnected at adjacent longitudinal edges thereof by flexible means of greater flexibility than the flexibility of said belt portions and which have been formed by providing elongate slits extending through said belt and longitudinally of said conveyor belt;

means forming and supporting said belt portions throughout substantially the entire and upper run of said conveyor belt into a sharp-angled V-shaped trough having substantially planar downwardly convergent sides by flexing said belt portions about said interconnections;

means vibrating said forming and supporting means, and in turn vibrating the formed and supported V-shaped formation of said belt portions throughout an extent of said belt portions commencing at an entrance end of said conveyor belts and terminating spaced from an exit end thereof; and means for supplying a continuous stream of said collocation of discrete particles for said particles to fall into said V-shaped trough at a location adjacent said entrance end of said conveyor belt;

whereby, said vibrating belt portions act to maintain all particles other than single particles at rest in the inverted apex of said trough in continued animation pending location of said particles serially and sequentially in the inverted apex of said horizontally traveling trough; said belt portions being interconnected at their adjacent longitudinal edges by residual portions of said conveyor belt resulting from said longitudinal slitting of said conveyor belt at said spaced longitudinal positions.

* * * * *